United States Patent
Piermattie et al.

[11] Patent Number: 5,200,107
[45] Date of Patent: Apr. 6, 1993

[54] POLYMETHYLMETHACRYLATE SYRUP AS MEDIUM FOR LIQUID CRYSTALS

[75] Inventors: Virginia Piermattie, Pittsburgh; Sharon J. Elliot, Hempfield Township, Westmoreland County, both of Pa.

[73] Assignee: Aristech Chemical Corporation, Pittsburgh, Pa.

[21] Appl. No.: 749,788

[22] Filed: Aug. 26, 1991

[51] Int. Cl.$^5$ .............. C09K 19/52; C09K 19/00; G02F 1/13
[52] U.S. Cl. ................ 252/299.01; 428/1; 359/103
[58] Field of Search .......... 252/299.01, 582; 428/1; 359/51, 94, 103

[56] References Cited

U.S. PATENT DOCUMENTS

| | | | |
|---|---|---|---|
| 3,872,050 | 3/1975 | Benton et al. | 260/37 N |
| 4,428,873 | 1/1984 | Murayama et al. | 252/583 |
| 4,671,618 | 6/1987 | Wu et al. | 350/347 V |
| 4,673,255 | 6/1987 | West et al. | 350/347 V |
| 4,685,771 | 8/1987 | West et al. | 350/347 V |
| 4,688,900 | 8/1987 | Doane et al. | 350/347 V |
| 4,818,070 | 4/1989 | Gunjima et al. | 350/334 |
| 4,834,509 | 5/1989 | Gunjima et al. | 350/347 V |
| 4,869,847 | 9/1989 | Leslie et al. | 252/299.01 |
| 4,994,204 | 2/1991 | Doane et al. | 252/299.01 |
| 5,042,924 | 8/1991 | Terasaki et al. | 252/582 |

Primary Examiner—Robert L. Stoll
Assistant Examiner—Shean C. Wu
Attorney, Agent, or Firm—William L. Krayer

[57] ABSTRACT

Polymer dispersed liquid crystals are made by mixing liquid crystals into a syrup of polymethylmethacrylate dissolved in polymerizable monomers comprising methyl methacrylate, and polymerizing to monomers, to obtain finely dispersed micelles of liquid crystals which change refractive index in response to an electric field.

12 Claims, No Drawings

POLYMETHYLMETHACRYLATE SYRUP AS MEDIUM FOR LIQUID CRYSTALS

TECHNICAL FIELD

This invention relates to the manufacture or fabrication of liquid crystal devices and particularly to polymer dispersed liquid crystal ("PDLC") media.

A liquid crystal is a material which changes its index of refraction as a function of an applied electric field. PDLCs are solid compositions of polymer having dispersed within them liquid crystal compositions. The dispersions are made either in a solution of the polymer or in a monomer prior to polymerization; being insoluble in the polymer, the liquid crystal tends to form small droplets scattered throughout the solidified material. The PDLCs we work with are distinguished from dispersions of liquid crystals contained in relatively impermeable capsules.

BACKGROUND OF THE INVENTION

Four related patents which recite reliance on a patent application filed on Mar. 19, 1984 describe polymer dispersed liquid crystals. These are U.S. Pat. Nos. 4,671,618 to Wu et al, 4,673,255 to West et al, 4,685,771 to West et al, and 4,688,900 to Doane et al. These patents describe both a solvent method and a cure method for making PDLCs. In the solvent method, a fully polymerized polymer is dissolved in a solvent and the liquid crystal is distributed within the system. The solvent is driven off and the resulting solidified material is found to contain small droplets of liquid crystal distributed within it. In the cure method, the liquid crystal is dispersed in a medium of monomer and the monomer is subjected to polymerization conditions. Being inert with respect to the polymerization conditions and insoluble in the polymer, the liquid crystal becomes segregated into small domains scattered throughout the cured matrix. Segregation of the small droplets in either the cure method or the solvent method is known as phase separation.

Typical liquid crystal compositions include cyano biphenyls such as 4-cyano-4'-butylbiphenyl, 4-cyano-4'-hexylbiphenyl, 4-cyano-4'-heptylbiphenyl, 4-cyano-4'-octylbiphenyl, 4-cyano-4'-pentoxybiphenyl, 4-n-pentyl-n-cyano-biphenyl, and 4-cyano-4'-octoxybiphenyl. See West et al U.S. Pat. Nos. 4,685,771 and 4,673,255.

Fully polymerized polymethylmethacrylate ("PMMA") is used in solution in Examples II, V and VI of Wu et al U.S. Pat. No. 4,671,618. The PMMA, liquid crystal and solvent, such as acetone or trichloromethane, are mixed together to form a solution, and the solvent is driven off, causing the formation of a solid PMMA polymer with liquid crystal dispersed in it.

Murayama et al in U.S. Pat. No. 4,428,873 disclose the use of dissolved fully polymerized PMMA for the dispersion of other materials having electrooptical effects, such as p-nitroaniline, o-nitroaniline, 2-nitro-4-methoxyaniline, p-nitro-o-chloroaniline, 5-nitro-o-toluidine, 2-nitro-diphenylamine, 1,2-diamino-4-nitrobenzene, and p-nitrophenol.

Leslie et al in U.S. Pat. No. 4,869,847 use various monomeric media including several different acrylic monomers to polymerize to create very small liquid crystal domains. Difunctional acrylic oligomers are used by Gunjima et al in U.S. Pat. Nos. 4,818,070 and 4,834,509. Certain materials described as polyurethane prepolymers are employed by Benton et al in U.S. Pat. No. 3,872,050.

The reader may also be interested in "Polymer-Dispersed Liquid Crystals: Boojums at Work", MRS BULLETIN, January 1991, pages 22-28, Volume XVI, Number 1 (Materials Research Society) by J. William Doane, and "Polymer Dispersed Liquid Crystal Displays", by J. William Doane, Chapter 14, LIQUID CRYSTALS:APPLICATIONS AND USES, B. Bahadur, ed., World Scientific Publishing Co. (1990), on the use of liquid crystals for various practical purposes.

SUMMARY OF THE INVENTION

In spite of the relative technical and commercial success of liquid crystals, they still are difficult to process into useful devices. While PMMA is a desirable matrix material for liquid crystal devices, because of its clear transparency, it has not been extensively used. When used in the form of a solution in a solvent such as acetone which is driven off, it is difficult to control the process of removing solvent. It has also been difficult to assure that all of the liquid crystal is segregated into the desired discrete domains—the process is inefficient if any significant amount of liquid crystal is too thinly distributed in the matrix. The micelle size and shape is important to the proper functioning of most liquid crystal devices.

We have invented a process for making liquid crystal electric field responsive materials and devices wherein a PMMA syrup is employed as the liquid crystal carrier thereby eliminating the associated problems working with a solvent based system would present. By a PMMA syrup, we mean a solution of PMMA in methylmethacrylate monomer. The PMMA should be present in an amount of about 1 to about 25% of the syrup composition. While other monomers may be present, at least about 50% of the syrup should be methylmethacrylate monomer. The preparation will desirably also contain an effective polymerization initiator, preferably a redox system such as benzoyl peroxide with an amine, or a nonredox system such as benzoyl peroxide by itself.

DETAILED DESCRIPTION OF THE INVENTION

Our invention involves the use of PMMA syrup which comprises preferably a PMMA solution having a viscosity of about 2 to about 3.5 poise. Where the molecular weight of the polymer is about 400,000 to about 800,000, the percent solids should be about ten (about 8 to about 12); if a lower molecular weight is used, i.e. about 170,000 to about 200,000, higher concentrations of solids (20-22%) may be used. Generally, we may use PMMA having molecular weights of about 150,000 to 1,000,000 in concentrations varying from about 25% by weight for the lower molecular weights to about 8% for the higher molecular weights; for molecular weights between 150,000 and 1,000,000, the desired concentrations should be decreased from about 25% in increments of slightly less than 2% per 100,000 increase in molecular weight, although persons skilled in the art will recognize that there can be considerable variation in the concentration, i.e. up to about 50%, at each level, depending on the convenience of handling desired or needed.

We mix with the syrup a commercial or other liquid crystal such as any of those disclosed in the patents described in the Background of the Invention, which are incorporated by reference. The amount of liquid crystal should be selected with several factors in mind, such as the thickness of the film or sheet to be made and the polymerization system, which can control the size of the liquid incorporated to an extent of as much as 70% by weight, but generally will be in the range of about 25–55%. The balance of the mixture is an acrylic monomer, preferably methyl methacrylate; at least about 50% of the monomer content of the matrix solution is methyl methacrylate. Up to about 15% crosslinking (preferably di-ethylenically unsaturated) monomer, such as ethylene glycol dimethacrylate, allyl methacrylate, and 1,6 hexane diol dimethacrylate may be used. The remaining monomers may be selected from any copolymerizable monomers compatible with an acrylic system, i.e. styrene or acrylonitrile, but it should be kept in mind that the system should have the properties conducive for the formation of the liquid crystal micelles to occur during the polymerization process.

We prefer to use monomers of the formula

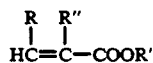

where R and R" are independently selected from H and $CH_3$, and R' is an alkyl group of 1 to about 6 carbon atoms. The polymeric portion of the syrup is preferably substantially polymethylmethacrylate, i.e. at least about 90% of the monomers of the polymer dissolved in the monomer is methyl methacrylate and the balance are monomers copolymerizable with methyl methacrylate. We prefer to use monomers of the formula $CH_2=CY-COOX$ where X is an alkyl group of 2–4 carbon atoms and Y is H or $CH_3$. Thus it will be seen that our preparations include:

a. A monomeric solvent capable of polymerizing into a transparent medium, comprising at least about 50% methyl methacrylate, the balance being copolymerizable monomers, preferably of the formula

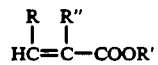

where R and R" are independently selected from H and $CH_3$, and R' is an alkyl group of 1 to about 6 carbon atoms.

b. An acrylic polymer polymerized from at least about 90% by weight methyl methacrylate, the balance of the polymer being derived from monomers copolymerizable with methyl methacrylate, preferably selected from monomers of the formula $CH_2=CY-COOX$ where X is an alkyl group of 2–4 carbon atoms and Y is H or $CH_3$.

c. A polymerization initiator effective for the acrylic system, and d. Liquid crystal. As indicated above, the liquid crystal may comprise about 25–55% of the mixture. If it appears that some of the liquid crystal will not be electric field responsive because of its distribution properties, it may be desirable to increase the original concentration. Since the initiator seldom may exceed about 6% of the unpolymerized monomer, it may be seen that, without considering the effects of its presence, the composition comprises liquid crystal dispersed in a polymethylmethacrylate syrup comprising about 1%, to about 25% by weight polymethylmethacrylate (which may contain up to about 10% other monomers as described above) dissolved in copolymerizable monomer (comprising at least 50% methyl methacrylate) in a weight ratio of liquid crystal to syrup of about 1:3 to about 1.3:1.

The following Table I shows the results of tests in which "switchable windows" were fabricated from PDLC films made as indicated. In particular, Examples 1 and 2 describe the procedures used for Samples 1 and 2 in Table 1. In the Table, BPO is benzoyl peroxide and HPT is bis(2-hydroxyisopropyl)-p-toluidine.

EXAMPLE 1

A mixture of 0.11 g polymethylmethacrylate syrup (10% solution, about 600,000 average molecular weight), 0.099 g E-7 liquid crystal (from EMerck), 0.005 20 micron polystyrene spacers, and 0.009 g benzoyl peroxide was put between 2 indium tin oxide-coated glass slides. The sample was cured in an 80° C. oven for 1 hour. Upon cooling the sample turned hazy, indicating that the liquid crystal was in the opaque, light scattering state.

After the sample was completely cooled, a voltage was applied across the plates. When the voltage was applied, the sample turned clear. When the voltage was turned off, the plates became hazy again.

EXAMPLE 2

A mixture of 0.123 g polymethylmethacrylate syrup (21% solution, about 185,000 average molecular weight, 0.095 g E-7 liquid crystal, 0.003 g BPO, PS spacers, and 0.0006g HPT, added last, was put between 2 indium tin oxide-coated glass slides. The sample sat at room temperature for 45 minutes. During this time the sample became hazy. When a voltage was applied across the plates, they went clear. When the voltage was turned off, the samples returned to being hazy (liquid crystal is in the opaque, light scattering state).

TABLE I

| Sample No. | Syrup[x] | (%) Syrup | (%) Liquid Crystal | Initiator | (%) Initiator[*] | Cure Temperature | Switchable |
|---|---|---|---|---|---|---|---|
| 1 | A | 47 | 53 | BPO | 4.3 | 80° C. | Yes |
| 2 | B | 56 | 44 | BPO/HPT | 1.65[**] | Amb. | Yes |

[*] % based on total syrup concentration + liquid crystal concentration.
[**] BPO/amine ratio 5:1.
[x] Syrup A: 10% solution of PMMA having a m.w. of about 600,000; Syrup B: 21% solution of PMMA having a m.w. of about 185,000.

The procedure is quite convenient in that no special temperatures or stringent conditions need be observed. Solvent need not be driven off, and room temperature cure may be used.

The electric field responsive materials of our invention can be used to make liquid crystal displays, i.e. similar to those known in the art in which only certain desired portions of the material are activated to render it transparent or otherwise responsive to the electric field because of the variable refractive index of the liquid crystal.

We claim:

1. A composition for making liquid crystal films comprising liquid crystal dispersed in a polymethylmethacrylate syrup comprising about 1% to about 25% by weight polymethylmethacrylate dissolved in methyl methacrylate monomer, in a weight ratio of liquid crystal to syrup of about 1:3 to about 1.3:1.

2. Composition of claim 1 including a polymerization initiator.

3. Composition of claim 1 wherein the molecular weight of the polymethylmethacrylate is about 150,000 to about 1,000,000.

4. Composition of claim 1 wherein the polymethylmethacrylate has a molecular weight of about 400,000 to about 800,000 and about 8 to about 12% is present in the syrup.

5. Composition of claim 1 wherein the polymethylmethacrylate has a molecular weight of about 170,000 to about 200,000 and about 20 to about 22% is present in the syrup.

6. Composition of claim 1 including up to about 15% cross-linking agent.

7. Composition of claim 1 in which the polymethylmethacrylate includes up to about 10% monomers other than methyl methacrylate.

8. Composition of claim 1 wherein the polymethylmethacrylate is dissolved in, in addition to methyl methacrylate, up to about 50% copolymerizable monomers.

9. Method of making a normally hazy material which becomes transparent as a function of the application of an electric field, comprising dissolving liquid crystal in a syrup comprising about 1% to about 25% polymethylmethacrylate and about 75% to about 99% methyl methacrylate, initiating polymerization, and forming the syrup containing the liquid crystal into a film as it polymerizes.

10. Method of making a liquid crystal display device comprising coating a film of the composition of claim 1 on a substrate that has a conductive coating and polymerizing the methyl methacrylate of said composition, thereby forming discrete micelles of liquid crystal dispersed throughout the resulting polymethylmethacrylate.

11. Liquid crystal display device made by the method of claim 10.

12. Composition of claim 8 wherein the copolymerizable monomers are selected from the group consisting of styrene, acrylonitrile, and monomers of the formula

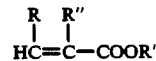

where R and R" are independently selected from H and CH$_3$, and R, is an alkyl group of 1 to about 6 carbon atoms.

* * * * *

UNITED STATES PATENT AND TRADEMARK OFFICE
CERTIFICATE OF CORRECTION

PATENT NO.  : 5,200,107
DATED       : April 6, 1993
INVENTOR(S) : Virginia Piermattie and Sharon J. Elliott It is certified that error appears in the above-identified patent and that said Letters Patent is hereby corrected as shown below:

Title page, item [75] Inventors:
Under "Inventors", change "Sharon J. Elliot" to -- Sharon J. Elliott --.

Column 3, line 4, after "liquid", insert -- crystal droplets to be made. Liquid crystal can be --.

Signed and Sealed this

First Day of February, 1994

*Attest:*

*Attesting Officer*

BRUCE LEHMAN

*Commissioner of Patents and Trademarks*